United States Patent
Senoo

(10) Patent No.: US 10,727,723 B2
(45) Date of Patent: Jul. 28, 2020

(54) MOTOR AND METHOD FOR MANUFACTURING THE SAME

(71) Applicant: FANUC CORPORATION, Yamanashi (JP)

(72) Inventor: Tatsuya Senoo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 164 days.

(21) Appl. No.: 16/002,225

(22) Filed: Jun. 7, 2018

(65) Prior Publication Data

US 2018/0358872 A1    Dec. 13, 2018

(30) Foreign Application Priority Data

Jun. 12, 2017    (JP) .................... 2017-115153

(51) Int. Cl.
| | | |
|---|---|---|
| *H02K 15/12* | (2006.01) | |
| *B29C 33/58* | (2006.01) | |
| *H02K 1/18* | (2006.01) | |
| *H02K 15/02* | (2006.01) | |
| *H02K 5/10* | (2006.01) | |
| *B29C 45/14* | (2006.01) | |
| *B29L 31/00* | (2006.01) | |

(52) U.S. Cl.
CPC ............ *H02K 15/12* (2013.01); *B29C 33/58* (2013.01); *H02K 1/185* (2013.01); *B29C 45/14639* (2013.01); *B29L 2031/749* (2013.01); *H02K 5/10* (2013.01); *H02K 15/02* (2013.01)

(58) Field of Classification Search
CPC .......... H02K 15/12; H02K 15/02; H02K 5/10; B29C 33/58; B29C 45/14639; B29L 2031/749
See application file for complete search history.

(56) References Cited

U.S. PATENT DOCUMENTS

2005/0264113 A1* 12/2005 Suzuki .................... F16K 31/04
                                                  310/80
2015/0368418 A1* 12/2015 Wilken ...................... C08J 7/08
                                                  524/862

FOREIGN PATENT DOCUMENTS

| CN | 104143863 A | 11/2014 |
|---|---|---|
| CN | 105102515 A | 11/2015 |
| JP | S50-134121 A | 10/1975 |
| JP | H01-198255 A | 8/1989 |
| JP | H02-125566 U | 10/1990 |
| JP | H08-223866 A | 8/1996 |

(Continued)

OTHER PUBLICATIONS

An Office Action mailed by the Japanese Patent Office dated Mar. 19, 2019, which corresponds to Japanese Patent Application No. 2017-115153 and is related to U.S. Appl. No. 16/002,225; with English translation.

(Continued)

*Primary Examiner* — Jue Zhang
(74) *Attorney, Agent, or Firm* — Studebaker & Brackett PC

(57) ABSTRACT

A motor of the present invention includes a stator having windings. The stator includes: a cylindrical outer member; a mold resin portion that molds the windings with a resin; and a stress non-transmitting portion provided between the mold resin portion and the outer member so as not to transmit stress to the outer member due to shrinking of the mold resin portion or reduce the amount of transmitted stress.

2 Claims, 4 Drawing Sheets

(56) References Cited

FOREIGN PATENT DOCUMENTS

| JP | 2004-120923 | A | | 4/2004 | | |
|----|----|----|----|----|----|----|
| JP | 2004-336928 | A | | 11/2004 | | |
| JP | 2011239526 | A | | 11/2011 | | |
| JP | 2012-070515 | A | | 4/2012 | | |
| JP | 2015-097430 | A | | 5/2015 | | |
| WO | 2016/113846 | A1 | | 7/2016 | | |
| WO | 2017/056163 | A1 | | 4/2017 | | |
| WO | WO-2017056163 | A1 | * | 4/2017 | ............ | H02K 1/187 |
| WO | 2017/085860 | A1 | | 5/2017 | | |

OTHER PUBLICATIONS

An Office Action mailed by the Japanese Patent Office dated Dec. 11, 2018, which corresponds to Japanese Patent Application No. 2017-115153 and is related to U.S. Appl. No. 16/002,225.

An Office Action mailed by the State Intellectual Property Office of the People's Republic of China dated Dec. 27, 2019, which corresponds to Chinese Patent Application No. CN201810575744.4.

An Office Action mailed by the State Intellectual Property Office of the People's Republic of China dated May 15, 2020, which corresponds to Chinese Patent Application No. 201810575744.4 and is related to U.S. Appl. No. 16/002,225; with English language translation.

* cited by examiner

MOTOR AND METHOD FOR MANUFACTURING THE SAME

This application is based on and claims the benefit of priority from Japanese Patent Application No. 2017-115153, filed on Jun. 12, 2017, the content of which is incorporated herein by reference.

BACKGROUND OF THE INVENTION

Field of the Invention

The present invention relates to a motor and a method for manufacturing the same.

Related Art

Conventionally, a motor which includes a stator having windings and a rotor disposed rotatably on an inner side of the stator and in which the windings are molded with a resin in order to enhance heat dissipation properties and resistance to environment of the windings is known (see Patent Documents 1 to 3).
Patent Document 1: Japanese Unexamined Patent Application, Publication No. 2004-336928
Patent Document 2: Japanese Unexamined Patent Application, Publication No. 2004-120923
Patent Document 3: Japanese Unexamined Patent Application, Publication No. 2015-097430

SUMMARY OF THE INVENTION

The resin that molds the windings is formed by heating and curing in a state of being in close contact with an outer member of the stator. Due to this, when the resin returns to a room-temperature environment, pulling of the outer member occurs and deforms the stator. As a result, there is a problem that a stator of a type that the stator is inserted in a casing cannot be inserted in a casing. Moreover, when it is necessary to perform centering of a stator, a reference surface of the centering is deformed and it is difficult to perform centering.

An object of the present invention is to provide a motor capable of suppressing deformation of a stator due to molding and a method for manufacturing the same.

(1) A motor (for example, a motor 1, 11, 21, or 31 to be described later) according to the present invention is a motor including a stator (for example, a stator 2 to be described later) having windings, wherein the stator includes: a cylindrical outer member (for example, an outer member 4 to be described later); a mold resin portion (for example, a mold resin portion 5 to be described later) that molds the windings with a resin; and a stress non-transmitting portion (for example, a stress non-transmitting portion 6, 16, 26, or 36 to be described later) provided between the mold resin portion and the outer member, the stress non-transmitting portion not transmitting stress to the outer member due to shrinking of the mold resin portion or reducing the amount of transmitted stress.

(2) In the motor according to (1), the stress non-transmitting portion may be a space.

(3) In the motor according to (1), the stress non-transmitting portion may be an elastic sealing agent.

(4) A method for manufacturing the motor according to any one of (1) to (3) including: a step (for example, a coating step S11 to be described later) of coating an inner side of the outer member with a mold releasing agent; a step (for example, a molding step S12 to be described later) of molding the mold resin portion so that the mold releasing agent is interposed between the mold resin portion and the outer member; and a step (for example, a detaching step S13 to be described later) of detaching the mold releasing agent.

(5) A method for manufacturing the motor according to any one of (1) to (3) including: a step (for example, an arrangement step S21 to be described later) of arranging a mold releasing member having releasable properties or a mold so as to make contact with an inner side of the outer member; a step (for example, a molding step S22 to be described later) of molding the mold resin portion so that the mold releasing member or the mold is interposed between the mold resin portion and the outer member; and a step (for example, a detaching step S23 to be described later) of detaching the mold releasing member or the mold.

According to the present invention, it is possible to provide a motor capable of suppressing deformation of a stator due to molding and a method for manufacturing the same.

DETAILED DESCRIPTION OF THE INVENTION

Figure 1:
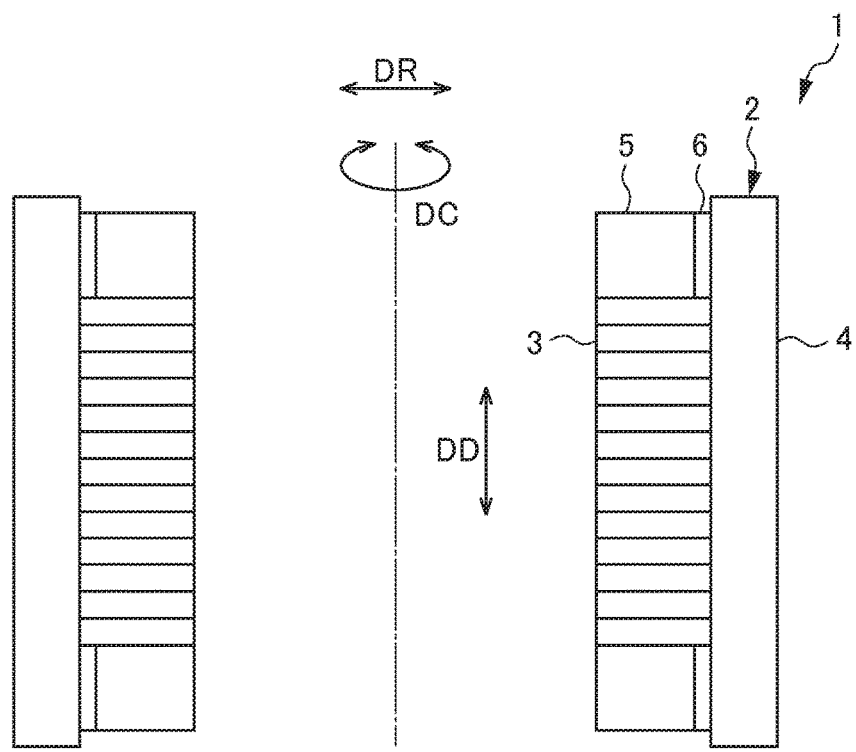
FIG. 1 is a schematic cross-sectional view of a motor according to a first embodiment of the present invention.

Hereinafter, a first embodiment of the present invention will be described in detail with reference to the drawings. In the description of the second and subsequent embodiments, components common to the first or other embodiment will be denoted by the same reference numerals and the description thereof will be omitted. In the description of the second and subsequent embodiments, the description of effects similar to the effects provided by the first or other embodiment will be omitted.

First Embodiment

FIG. 1 is a schematic cross-sectional view of a motor 1 according to the first embodiment of the present invention. As illustrated in FIG. 1, the motor 1 of the present embodiment includes a stator 2 having windings (not illustrated) and a rotor (not illustrated) disposed rotatably on an inner side in a radial direction DR of the stator 2

The stator 2 has a stator core 3, windings (not illustrated), an outer member 4, a mold resin portion 5, and a stress non-transmitting portion 6.

The stator core 3 is formed of a plurality of magnetic steel sheets stacked in an axial direction DD, for example. The stator core 3 has a cylindrical back yoke and a plurality of teeth protruding toward the inner side of the radial direction DR from the back yoke. The windings (not illustrated) are wound around each of the plurality of teeth in the stator core 3.

The outer member 4 is a tubular member formed of aluminum or iron-based materials, for example. The outer member 4 is disposed to surround the back yoke of the stator core 3 from the outer side of the radial direction DR. The outer member 4 is fixed to the back yoke by shrink-fitting, for example.

The mold resin portion 5 is disposed on the inner side of the radial direction DR of the outer member 4 so that the stress non-transmitting portion 6 is interposed between the outer member 4 and the mold resin portion 5 in the radial direction DR on the outer side of the axial direction DD the stator core 3 and the windings (not illustrated) wound around the stator core 3. The mold resin portion 5 is obtained by filling a mold (not illustrated) with a liquid resin and curing the resin after the stator core 3 in which the windings (not illustrated) are wound and the outer member 4 and the stress non-transmitting portion 6 are disposed is inserted in the mold.

The stress non-transmitting portion 6 is disposed on the outer side of the axial direction DD of the stator core 3 and the windings (not illustrated) wound around the stator core 3 and on the inner side of the radial direction DR of the outer member 4. The stress non-transmitting portion 6 is provided between the mold resin portion 5 and the outer member 4 in the radial direction DR to suppress the amount of stress transmitted to the outer member 4 due to shrinking of the mold resin portion 5. Specifically, the stress non-transmitting portion 6 is formed of a strip-shaped member bonded to an inner circumference of the outer member 4 along a circumferential direction DC or an annular member disposed in the inner circumference of the outer member 4 along the circumferential direction DC. The stress non-transmitting portion 6 is preferably formed of an insulating material in order to secure insulation between the outer member 4 and the windings (not illustrated) wound around the stator core 3.

Generally, a resin that molds windings is formed by heating and curing in a state of being in close contact with an outer member of a stator. Due to this, when the resin returns to a room-temperature environment, pulling of the outer member occurs and deforms the stator.

On the other hand, according to the motor 1 of the present embodiment, since the stress non-transmitting portion 6 is provided between the mold resin portion 5 and the outer member 4, the mold resin portion 5 is heated and cured in a state in which the mold resin portion 5 and the outer member 4 are separated. Due to this, when the mold resin portion 5 returns to a room-temperature environment, pulling of the outer member 4 cannot occur easily and deformation of the stator 2 due to molding can be suppressed.

Second Embodiment

Figure 2:
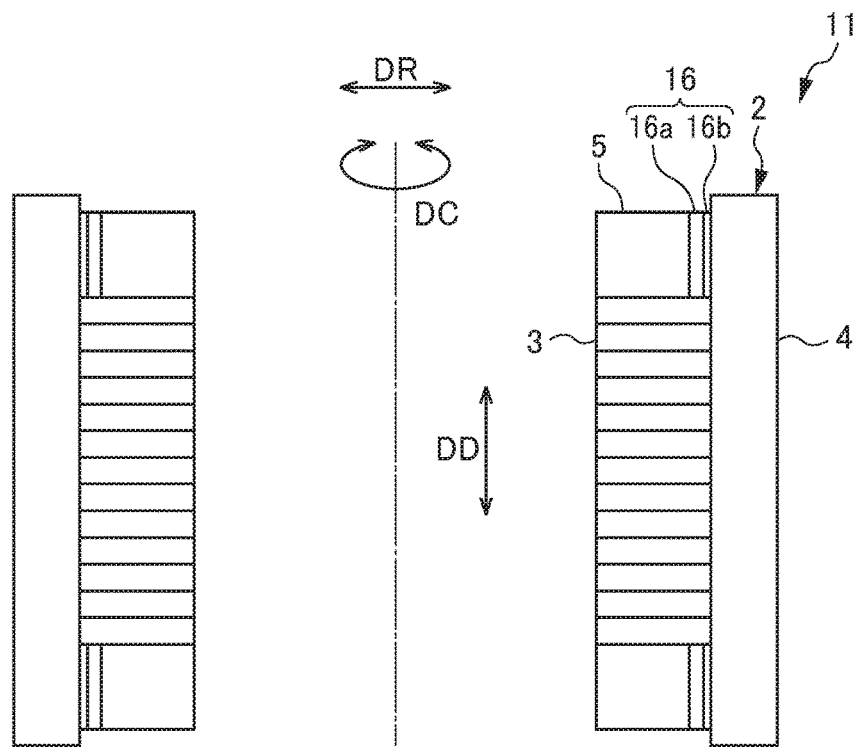
FIG. 2 is a schematic cross-sectional view of a motor according to a second embodiment of the present invention.

FIG. 2 is a schematic cross-sectional view of a motor 11 according to a second embodiment of the present invention. The motor 11 according to the present embodiment is different from that of the first embodiment in that the stress non-transmitting portion 16 is included instead of the stress non-transmitting portion 6.

In the motor 1 according to the first embodiment, when the heated and cured mold resin portion 5 returns to a room-temperature environment, the mold resin portion 5 pulls the stress non-transmitting portion 6 and a gap may be formed between the stress non-transmitting portion 6 and the outer member 4. When a gap is formed between the stress non-transmitting portion 6 and the outer member 4, there is a problem that moisture or the like may enter from the gap.

Therefore, as illustrated in FIG. 2, the motor 11 includes a member 16a equivalent to the stress non-transmitting portion 6 and an elastic sealing agent 16b interposed between the member 16a and the outer member 4 as the stress non-transmitting portion 16. The sealing agent 16b is coated between the member 16a and the outer member 4 and is pulled when the mold resin portion 5 is heated and cured and returns to a room-temperature environment. However, since the sealing agent 16b is thin and elastic, the amount of stress transmitted to the outer member 4 due to shrinking of the mold resin portion 5 is reduced.

According to the motor 11 of the present embodiment, since the sealing agent 16b is interposed between the member 16a and the outer member 4, even when the member 16a is pulled when the heated and cured mold resin portion 5 returns to a room-temperature environment, a gap cannot be easily formed between the member 16a and the outer member 4, and a problem such as entrance of moisture can be suppressed.

Third Embodiment

Figure 3:
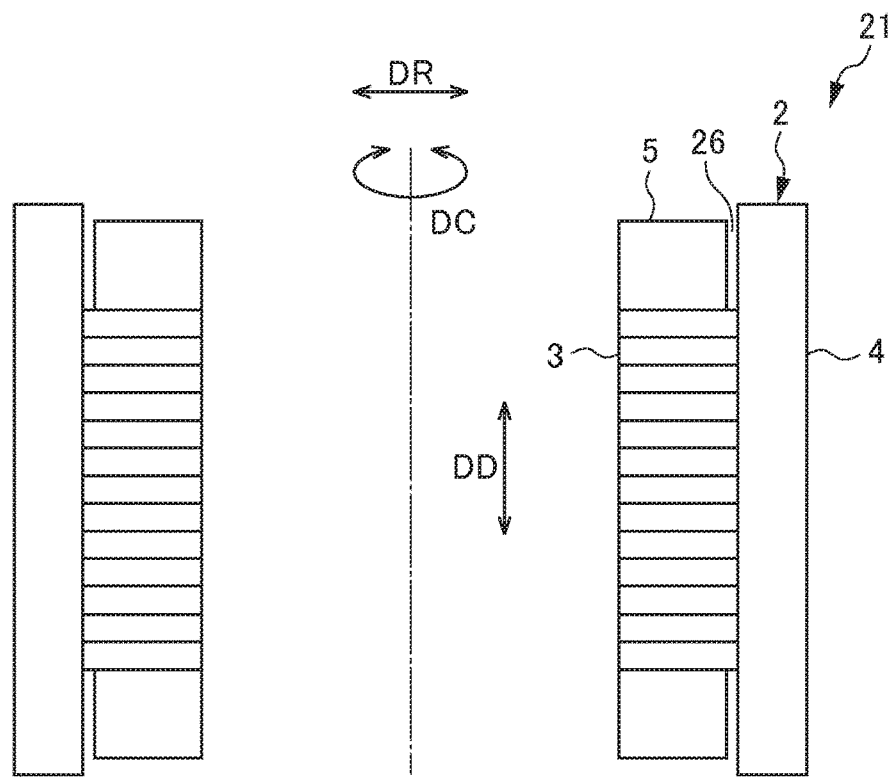
FIG. 3 is a schematic cross-sectional view of a motor according to a third embodiment of the present invention.

FIG. 3 is a schematic cross-sectional view of a motor 21 according to a third embodiment of the present invention. The motor 21 according to the present embodiment is different from that of the first embodiment in that a stress non-transmitting portion 26 is included instead of the stress non-transmitting portion 6.

As illustrated in FIG. 3, the stress non-transmitting portion 26 is a gap (space) formed between the mold resin portion 5 and the outer member 4 and stress is not transmitted to the outer member 4 due to shrinking of the mold resin portion 5.

Figure 4:
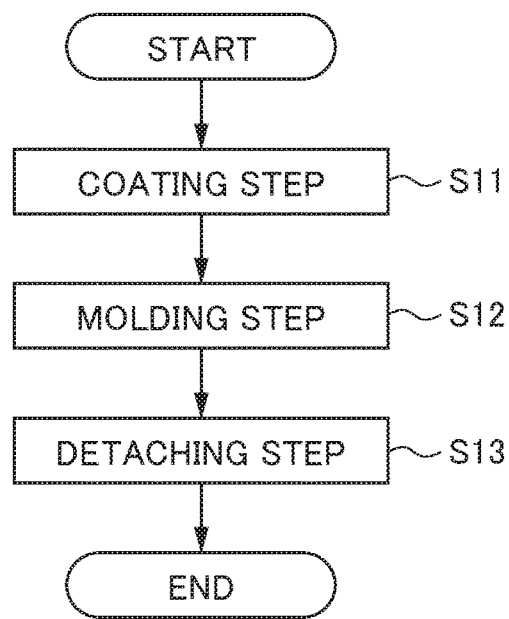
FIG. 4 is a flowchart illustrating a method for manufacturing the motor according to the third embodiment of the present invention.

Next, a method for manufacturing the motor 21 will be described with reference to FIGS. 3 and 4. FIG. 4 is a flowchart illustrating a method for manufacturing the motor 21 according to the third embodiment.

As illustrated in FIG. 4, the method for manufacturing the motor 21 includes a coating step S11, a molding step S12, and a detaching step S13.

In the coating step S11, a mold releasing agent (not illustrated) is coated on the inner side of the radial direction DR of the outer member 4 on the outer side of the axial direction DD of the stator core 3 and the windings (not illustrated) wound around the stator core 3.

In the molding step S12, the mold resin portion 5 is molded so that the mold releasing agent (not illustrated) is interposed between the mold resin portion 5 and the outer member 4. Specifically, in the molding step S12, the stator core 3 around which the windings (not illustrated) are wound, in which the outer member 4 is disposed, and which is coated with the mold releasing agent (not illustrated) is inserted in a mold (not illustrated), a liquid resin is flown into the mold, and the resin is cured to mold the mold resin portion 5.

In the detaching step S13, the motor 21 is detached from the mold (not illustrated) and the mold releasing agent (not illustrated) is detached. In this way, the motor 21 is manufactured.

Figure 5:
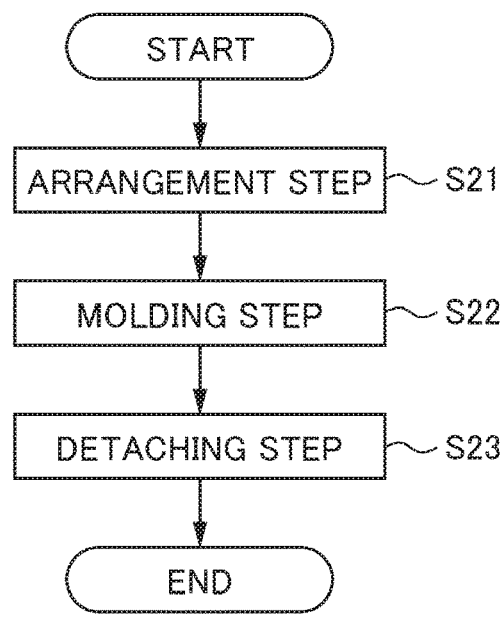
FIG. 5 is a flowchart illustrating another method for manufacturing the motor according to the third embodiment of the present invention.

Next, another method for manufacturing the motor 21 will be described with reference to FIG. 5. FIG. 5 is a flowchart illustrating another method for manufacturing the motor 21 according to the third embodiment of the present invention.

As illustrated in FIG. 5, the other method for manufacturing the motor 21 includes an arrangement step S21, a molding step S22, and a detaching step S23.

In the arrangement step S21, a mold releasing member (not illustrated) having releasable properties such as a fluorine resin is disposed on the outer side of the axial direction DD of the stator core 3 and the windings (not illustrated) wound around the stator core 3 so as to make contact with the inner side of the radial direction DR of the outer member 4.

In the molding step S22, the mold resin portion is molded so that the mold releasing member (not illustrated) is interposed between the mold resin portion 5 and the outer member 4. Specifically, in the molding step S22, the stator core 3 around which the windings (not illustrated) are wound and in which the outer member 4 and the mold releasing member (not illustrated) are disposed is inserted in a mold (not illustrated), a liquid resin is flown into the mold, and the resin is cured to mold the mold resin portion 5.

In the detaching step S23, the motor 21 is detached from the mold (not illustrated) and the mold releasing member (not illustrated) is detached. In this way, the motor 21 is manufactured.

Instead of using the mold releasing member (not illustrated), the motor 21 may be manufactured by forming the mold (not illustrated) for molding the mold resin portion 5 in such a shape that the mold makes contact with the inner side of the radial direction DR of the outer member 4.

Fourth Embodiment

Figure 6:
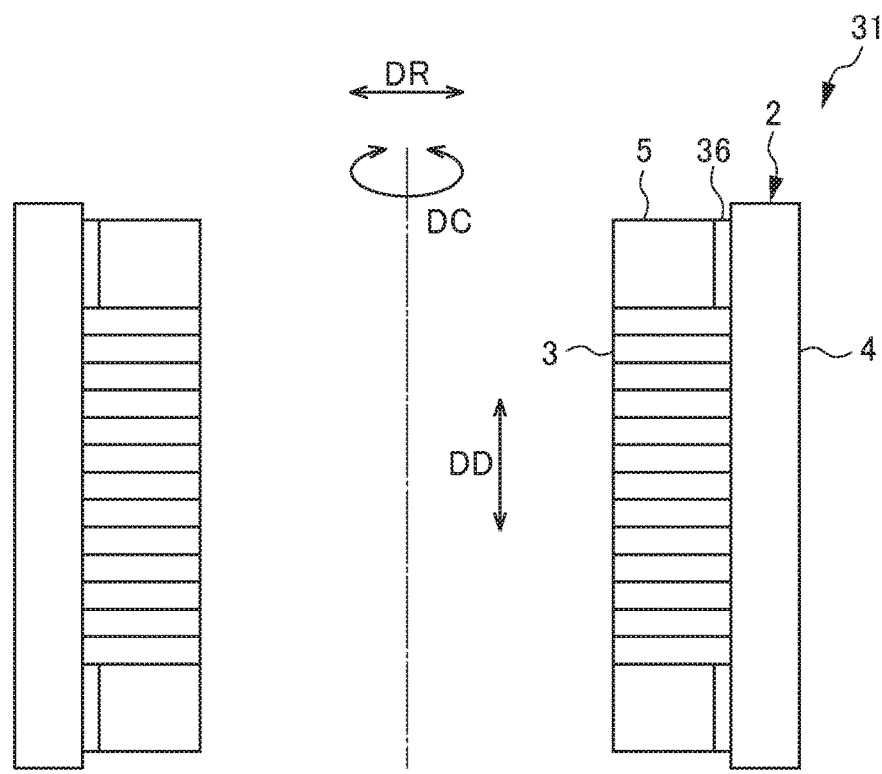
FIG. 6 is a schematic cross-sectional view of a motor according to a fourth embodiment of the present invention.

FIG. 6 is a schematic cross-sectional view of a motor 31 according to a fourth embodiment of the present invention. The motor 31 according to the present embodiment is different from that of the third embodiment in that a stress non-transmitting portion 36 is included instead of the stress non-transmitting portion 6.

As illustrated in FIG. 6, the stress non-transmitting portion 36 is an elastic sealing agent provided between the mold resin portion and the outer member 4 and reduces the amount of stress transmitted to the outer member 4 due to shrinking of the mold resin portion 5.

Figure 7:
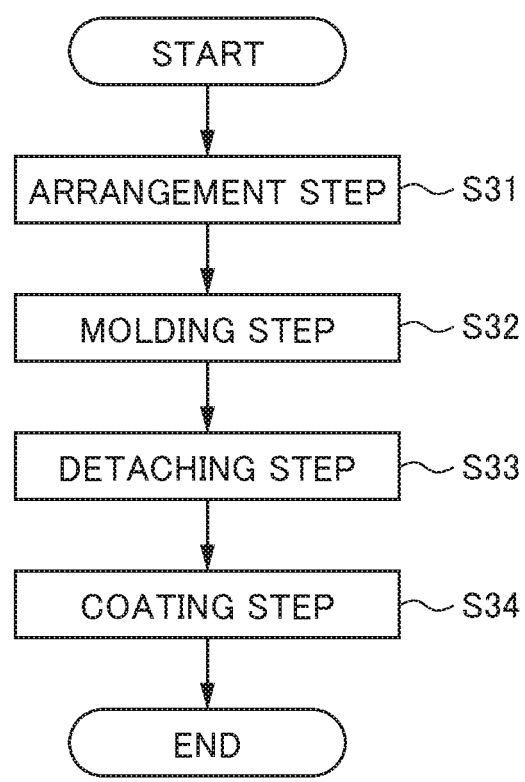
FIG. 7 is a flowchart illustrating a method for manufacturing the motor according to the fourth embodiment the present invention.

Next, a method for manufacturing the motor 31 will be described with reference to FIGS. 6 and 7. FIG. 7 is a flowchart illustrating a method for manufacturing the motor 31 according to the fourth embodiment of the present invention.

As illustrated in FIG. 7, a method for manufacturing the motor 31 includes an arrangement step S31, a molding step S32, a detaching step S33, and a coating step S34.

In the arrangement step S31, the stator core 3 around which the windings (not illustrated) are wound and in which the outer member 4 is disposed is inserted in a mold (not illustrated) so that the stator core 3 makes contact with the mold (not illustrated) on the inner side of the radial direction DR of the outer member 4 on the outer side of the axial direction DD of the stator core 3 and the windings (not illustrated) wound around the stator core 3.

In the molding step S32, the mold resin portion 5 is molded so that the mold (not illustrated) is interposed between the mold resin portion 5 and the outer member 4. Specifically, in the molding step S32, a liquid resin is flown into the mold (not illustrated) and the resin is cured to mold the mold resin portion 5.

In the detaching step S33, the motor 31 is detached from the mold (not illustrated). In this way, a gap is formed between the mold resin portion and the outer member 4. In the coating step S34, the gap between the mold resin portion 5 and the outer member 4 is coated with the stress non-transmitting portion 36 formed of a sealing agent. In this way, the motor 31 is manufactured.

While an embodiment of the present invention has been described, the present invention is not limited to the above-described embodiment. The advantages described in the present embodiment are examples of the most preferable advantages obtained from the present invention, and the advantages of the present invention are not limited to those described in the present embodiment. The motor of the present invention is preferably applied to a motor having a stator of a type (a built-in type) that the stator is inserted in a casing, but the motor to which the present invention can be applied is not limited thereto.

EXPLANATION OF REFERENCE NUMERALS 1, 11, 21, 31: Motor
2: Stator
3: Stator core
4: Outer member
5: Mold resin portion
6, 16, 26, 36: Stress non-transmitting portion
16a: Member
16b: Sealing agent
DR: Radial direction
DD: Axial direction
DC: Circumferential direction
S11, S34: Coating step
S12, S22, S32: Molding step
S13, S23, S33: Detaching step
S21, S31: Arrangement step

What is claimed is:

1. A motor comprising a stator having windings, wherein the stator includes:
    a cylindrical outer member;
    a mold resin portion that molds the windings with a resin;
    a stress non-transmitting portion provided between the mold resin portion and the outer member in a manner whereby that a strip-shaped member is positioned in a circumferential direction on an inner circumference of the outer member, the stress non-transmitting portion not transmitting stress to the outer member due to shrinking of the mold resin portion or reducing the amount of transmitted stress,
    space provided between the stress non-transmitting portion and the outer member; and
    wherein the cylindrical outer member is disposed to surround a back yoke of a stator core of the stator.

2. A method for manufacturing a motor provided with a stator having windings, wherein the stator includes:
    a cylindrical outer member; a mold resin portion that molds the windings with a resin; and
    a stress non-transmitting portion provided between the mold resin portion and the outer member, the stress non-transmitting portion not transmitting stress to the outer member due to shrinking of the mold resin portion or reducing the amount of transmitted stress,
    the method comprising:
    a step of coating an inner side of the outer member with a mold releasing agent;

a step of molding the mold resin portion so that the mold releasing agent is interposed between the mold resin portion and the outer member;

a step of detaching the mold releasing agent; and wherein the cylindrical outer member is disposed to surround a back yoke of a stator core of the stator.

* * * * *